United States Patent
Chen et al.

(10) Patent No.: US 9,588,543 B2
(45) Date of Patent: Mar. 7, 2017

(54) MEDIA PERIPHERAL INTERFACE, ELECTRONIC DEVICE WITH MEDIA PERIPHERAL INTERFACE, AND COMMUNICATION METHOD BETWEEN PROCESSOR AND PERIPHERAL DEVICE

(71) Applicant: MediaTek Inc., Hsin-Chu (TW)

(72) Inventors: Tsung-Huang Chen, New Taipei (TW); Li-Chun Tu, Hsinchu (TW); Wen-Chi Chao, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 392 days.

(21) Appl. No.: 14/139,951

(22) Filed: Dec. 24, 2013

(65) Prior Publication Data

US 2014/0189415 A1    Jul. 3, 2014

Related U.S. Application Data

(60) Provisional application No. 61/746,337, filed on Dec. 27, 2012.

(30) Foreign Application Priority Data

Jun. 13, 2013  (IN) .................. 2014/MUM/2013

(51) Int. Cl.
  *G06F 1/08*  (2006.01)
  *G06F 13/42*  (2006.01)
(52) U.S. Cl.
  CPC .............. *G06F 1/08* (2013.01); *G06F 13/423* (2013.01)
(58) Field of Classification Search
  CPC ....................................................... G06F 1/08
  See application file for complete search history.

(56) References Cited

U.S. PATENT DOCUMENTS

| 7,711,973 B2 | 5/2010 | Sakamaki |
| 7,779,188 B2 | 8/2010 | Spry et al. |

(Continued)

FOREIGN PATENT DOCUMENTS

| CN | 1710519 | 12/2005 |
| CN | 1710664 | 12/2005 |

(Continued)

OTHER PUBLICATIONS

Micron, "General DDR SDRAM Functionality" TN4605.p65—Rev. A; Micron DesignLine, vol. 8, Issue 3 (3Q99); 2001.*

(Continued)

*Primary Examiner* — Kim Huynh
*Assistant Examiner* — Joshua Neveln
(74) *Attorney, Agent, or Firm* — McClure, Qualey & Rodack, LLP (57) ABSTRACT

A media peripheral interface for communication between a processor and a peripheral device includes a clock port, a plurality of data I/Os, and a data strobe port. The clock port is operative to transfer a clock signal to the peripheral device. The data I/Os are provided for command transfer to the peripheral device and for data transfer to and from the peripheral device. The data strobe port is operative to transfer a data strobe signal to or from the peripheral device according to an instruction that the processor issues to the peripheral device. According to the clock signal, command information transferred via the data I/Os is captured. According to rising edges and falling edges of the data strobe signal, data transferred via the data I/Os are captured.

17 Claims, 8 Drawing Sheets

(56) References Cited

U.S. PATENT DOCUMENTS

| | | |
|---|---|---|
| 8,271,824 B2 | 9/2012 | Kuroki |
| 2007/0288778 A1 | 12/2007 | Zhuang et al. |
| 2009/0231936 A1* | 9/2009 | Choi .................... G11C 7/1051 |
| | | 365/189.17 |
| 2011/0296095 A1 | 12/2011 | Su et al. |
| 2012/0089770 A1* | 4/2012 | Kim .......................... G06F 1/12 |
| | | 711/103 |
| 2014/0133240 A1 | 5/2014 | Chen et al. |
| 2015/0242271 A1 | 8/2015 | Bennett |

FOREIGN PATENT DOCUMENTS

| | | |
|---|---|---|
| CN | 1815464 A | 8/2006 |
| CN | 1838103 A | 9/2006 |
| CN | 101221542 A | 7/2008 |
| CN | 101727412 A | 6/2010 |
| CN | 101884033 | 11/2010 |
| CN | 102262593 | 11/2011 |

OTHER PUBLICATIONS

DDR3 SDRAM Standard; JEDEC Solid State Technology Association; Jul. 2010; pp. 1-226.
"Synchronous Dynamic Random-Access Memory;" Wikipedia; Sep. 23, 2014; pp. 1-18.
PCI Local Bus Specification; Dec. 18, 1998; pp. 1-322.
PCI Local Bus Specification Passage; Dec. 18, 1998; pp. 1-12.

* cited by examiner

MEDIA PERIPHERAL INTERFACE, ELECTRONIC DEVICE WITH MEDIA PERIPHERAL INTERFACE, AND COMMUNICATION METHOD BETWEEN PROCESSOR AND PERIPHERAL DEVICE

CROSS REFERENCE TO RELATED APPLICATIONS

This application claims the benefit of U.S. Provisional Application No. 61/746,337 filed Dec. 27, 2012, the entirety of which is incorporated by reference herein. Further, this Application claims priority of India Patent Application No. 2014/MUM/2013, filed on Jun. 13, 2013, the entirety of which is incorporated by reference herein.

BACKGROUND OF THE INVENTION

Field of the Invention

The present invention relates to communication technology between a processor and a peripheral device.

Description of the Related Art

Nowadays, electronic devices are increasingly complex and a higher data rate is required. A simple but high-speed communication protocol between a processor and a peripheral device is called for.

BRIEF SUMMARY OF THE INVENTION

A media peripheral interface, an electronic device with the media peripheral interface, and a communication method between a processor and a peripheral device are disclosed.

In an exemplary embodiment of the invention, a media peripheral interface for communication between a processor and a peripheral device is disclosed. The media peripheral interface comprises a clock port, a plurality of data I/Os, and a data strobe port. The clock port is operative to transfer a clock signal to the peripheral device. The data I/Os are provided for command transfer to the peripheral device and for data transfer to and from the peripheral device. The data strobe port is operative to transfer a data strobe signal to or from the peripheral device according to an instruction that the processor issues to the peripheral device. According to the clock signal, command information transferred via the data I/Os is captured. According to rising edges and falling edges of the data strobe signal, data transferred via the data I/Os are captured.

In another exemplary embodiment of the invention, an electronic device is shown. In addition to the disclosed media peripheral interface, the disclosed electronic device comprises the processor and the peripheral device which are coupled to each other via the media peripheral interface. In an exemplary embodiment, the processor, the media peripheral interface and the peripheral device are enclosed in a single module (or a single package) as a system-in-package.

In another exemplary embodiment of the invention, a communication method between a processor and a peripheral device is shown, which comprises the following steps: transferring a clock signal to the peripheral device; transferring a data strobe signal to or from the peripheral device according to an instruction that the processor issues to the peripheral device; utilizing the clock signal to capture the command information transferred from the processor to the peripheral device; and, in accordance with rising edges and falling edges of the data strobe signal, capturing the data transferred between the processor and the peripheral device.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments of carrying out the invention. The description is made for the purpose of illustrating the general principles of the invention and should not be taken in a limiting sense. The scope of the invention is best determined by reference to the appended claims.

Figure 1:
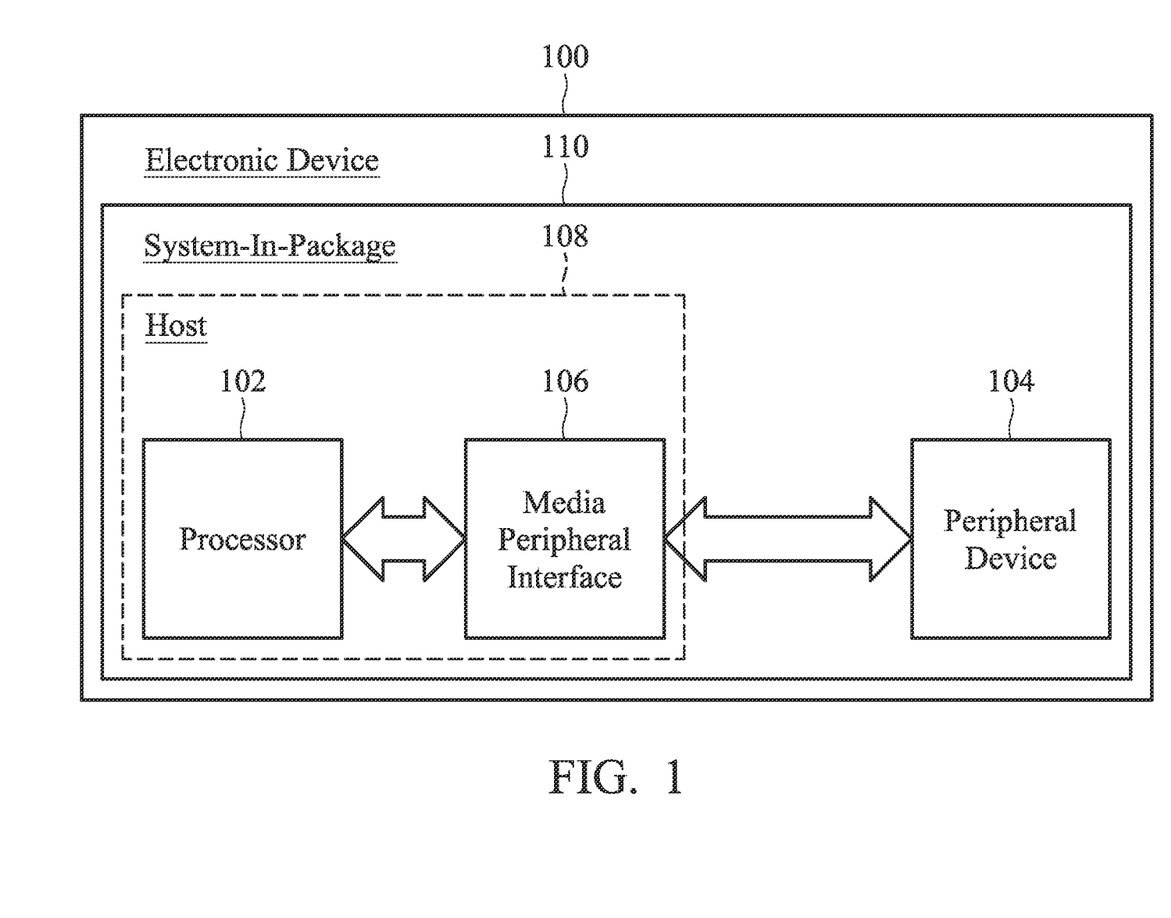
FIG. 1 is a block diagram depicting an electronic device 100 in accordance with an exemplary embodiment of the invention.

FIG. 1 is a block diagram depicting an electronic device 100 in accordance with an exemplary embodiment of the invention. The electronic device 100 comprises a processor 102, a peripheral device 104 and a media peripheral interface 106. The media peripheral interface 106 may be implemented as a hardware module and is coupled between the processor 102 and the peripheral device 104 for communication therebetween. The processor 102 and the media peripheral interface 106 form a host 108, and the host 108 is operative to communicate with the peripheral device 104. In some exemplary embodiments, the processor 102, the peripheral device 104 and the media peripheral interface 106 are enclosed in a single module (or a package) as a system-in-package (SIP) 110 (but not limited thereto). The peripheral device 104 may be a PSRAM, a FLASH memory, and so on. In addition to implementing a PSRAM interface or a FLASH interface, the media peripheral interface 106 may work as a display interface, a camera interface and so on.

As shown in FIG. 1, the media peripheral interface 106 comprises a clock port CLK, a plurality of data I/Os (labeled DATA), a data strobe port DQS, and a data mask signal port DM. The clock port CLK is operative to transfer a clock signal (also designated as CLK) to the peripheral device 104. The data I/Os (DATA) are provided for command transfer to the peripheral device 104 and for data transfer to and from the peripheral device 104. The data strobe port DQS is operative to transfer a data strobe signal (also designated as DQS) to or from the peripheral device 104 according to an instruction that the processor 102 issues to the peripheral device 104. For example, a data strobe signal DQS is transferred 'to' the peripheral device 104 when a 'write' instruction is issued by processor 102, and, a data strobe signal DQS is transferred 'from' the peripheral device 104 when a 'read' instruction is issued by the processor 102. The data mask signal port DM is optional (e.g., depending on the bit number of the data I/Os DATA), and operative to transfer a data mask signal (also designated as DM) to the peripheral device 104 to mask particular transition edges of the data strobe signal DQS accordingly. According to the clock signal CLK, the command information transferred via the data I/Os DATA is captured. As for data transferred via the data I/Os DATA, they are captured according to rising edges and falling edges of the data strobe signal DQS when the data mask signal DM is disabled. When the data mask signal DM is enabled, the data transferred via the data I/Os Data is captured according to particular transition edges (e.g. only H→L transition edges, or, only L→H transition edges) of the data strobe signal DQS. Note that the clock port CLK is not limited to providing a single connection terminal. In some embodiments, the clock port CLK may provide a differential pair and the clock signal CLK may be a differential signal. Further, note that the data strobe port DQS is not limited to providing a single connection terminal. In some embodiments, the data strobe port DQS may provide a differential pair and the data strobe signal DQS may be a differential signal.

FIGS. 2A-2B, FIGS. 3A-3C and FIG. 4 show waveforms of the signals transferred via the ports and I/Os of the disclosed media peripheral interface 106 in accordance with different exemplary embodiments of the invention. The signal CE# is a chip enable signal.

Figure 2A:
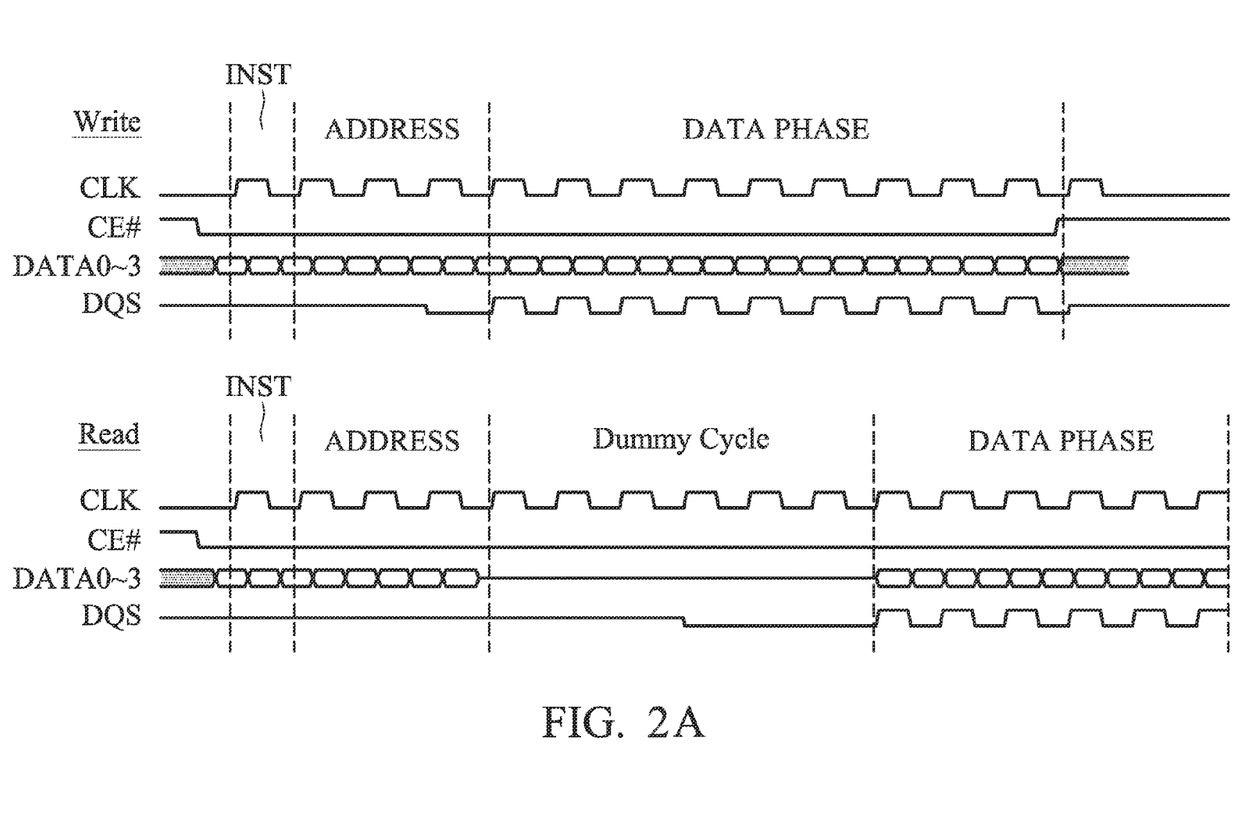
FIGS. 2A-2B, FIGS. 3A-3C and FIG. 4 show waveforms of the signals transferred via the ports and I/Os of the disclosed media peripheral interface 106 in accordance with different exemplary embodiments of the invention.

Referring to FIG. 2A, in this exemplary embodiment, the number of data I/Os (DATA0~3) is four and no data mask signal DM is utilized. Four bits are captured each time. Command information (instruction+read/write address) is first transferred via the data I/Os DATA0~3 in an instruction phase (phase INST) and an address phase (phase ADDRESS) and is captured according to the rising edges and the falling edges of the clock signal CLK. Later, in a data phase, data transferred via the data I/Os DATA0~3 are captured according to rising edges and falling edges of the data strobe signal DQS. In comparison with a conventional serial peripheral interface (SPI, wherein the data is captured according to the clock signal of the host side) the media peripheral interface 106 of the invention captures data according to the disclosed data strobe signal DQS. Thus, data reliability is dramatically improved especially for high-frequency applications.

Figure 2B:
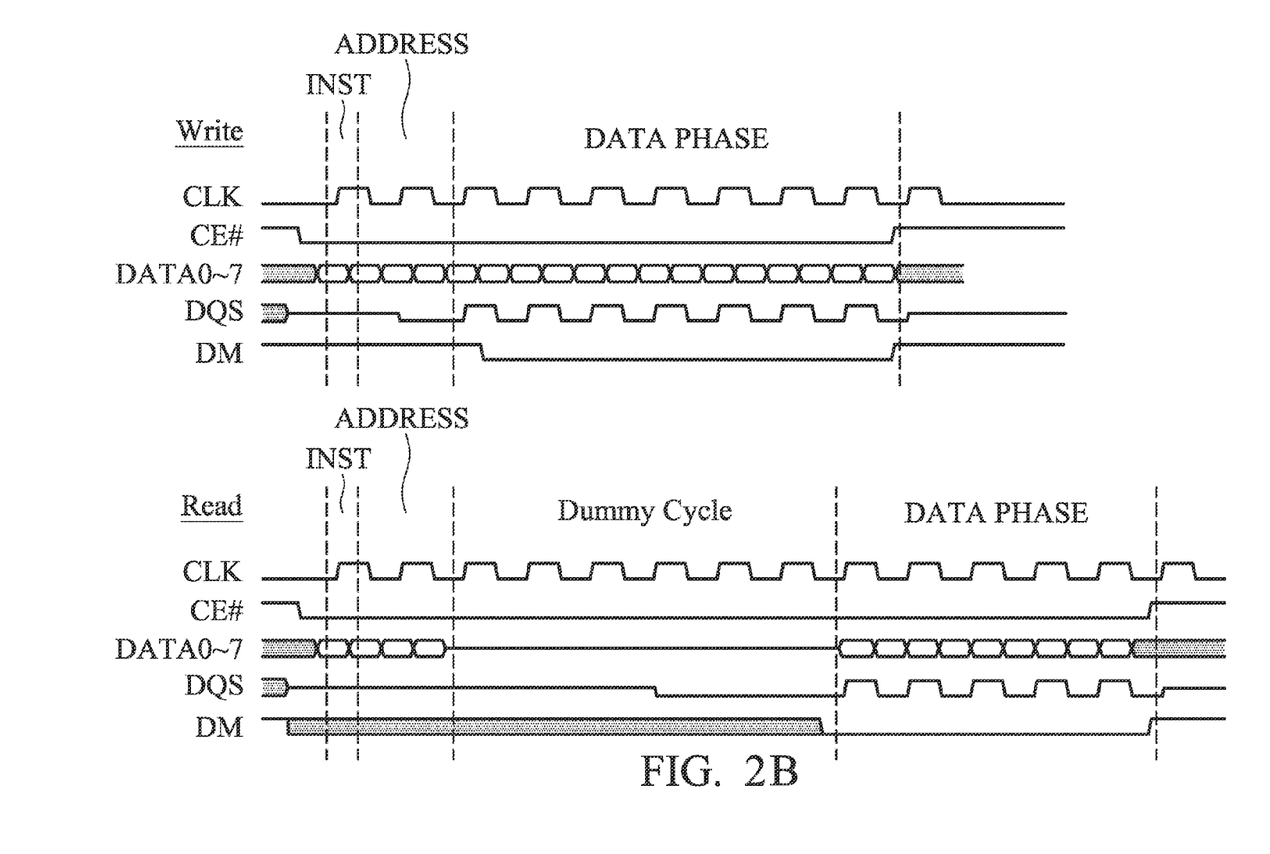

Referring to FIG. 2B, in this exemplary embodiment, the number of data I/Os (DATA0~7) is eight, quite large for byte addressing. Thus, a data mask port DM is provided by the media peripheral interface 106 and a data mask signal DM is transferred thereon, operative to mask particular transition edges (masking all H→L transitions, or, masking all L→H transitions) of the data strobe signal DQS. In FIG. 2B, the data mask signal DM is disabled in the DATA PHASE. Data transferred via the data I/Os DATA0~7 are captured according to rising edges and falling edges of the data strobe signal DQS. However, according to user requirements, the data strobe signal DQS may be enabled in other exemplary embodiments and only H→L transition edges or only L→H transition edges of the data strobe signal DQS are utilized in capturing the data transferred via the data I/Os DATA0~7.

Further, in some embodiments, the command information (instruction+read/write address) is captured by only particular transition edges (e.g. only H→L transition edges, or, only L→H transition edges) of the clock signal CLK rather than by all transition edges of the clock signal CLK.

Figure 3A:
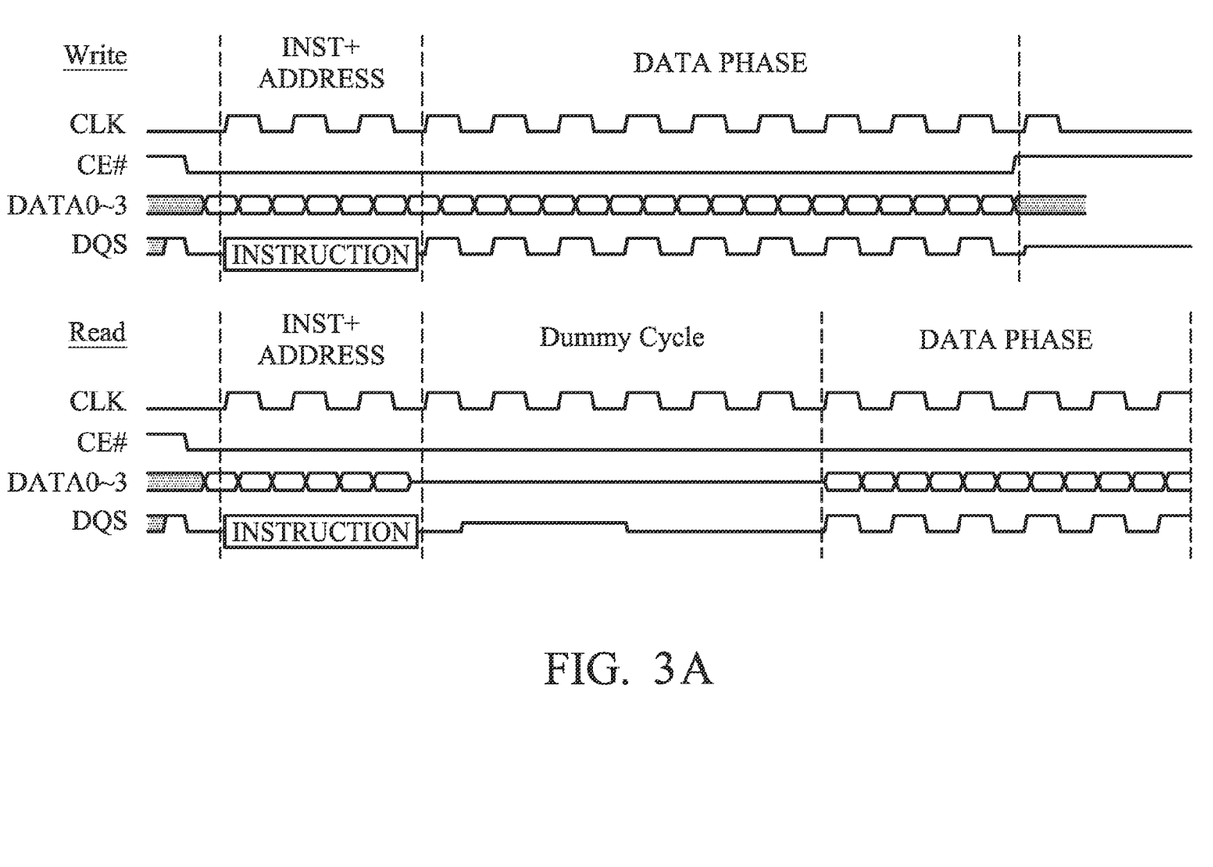

Further, instead of using the data I/Os to transfer the instruction that the processor 102 issues to the peripheral device 104, a blank area (e.g., between the data capture intervals) of the data strobe signal DQS is utilized to transfer the instruction. Referring to FIG. 3A, in this exemplary embodiment, the number of data I/Os (DATA0~3) is four and no data mask signal DM is utilized, and, the instruction that the processor 102 issues to the peripheral device 104 is transferred by the data strobe port DQS. In such an embodiment, the instruction and the read/write address are separately transferred by the data strobe port DQS and the data I/Os DATA0~3 and are simultaneously captured according to the rising edges and the falling edges of the clock signal CLK. Less clock cycles are required when command information is captured.

Figure 3B:
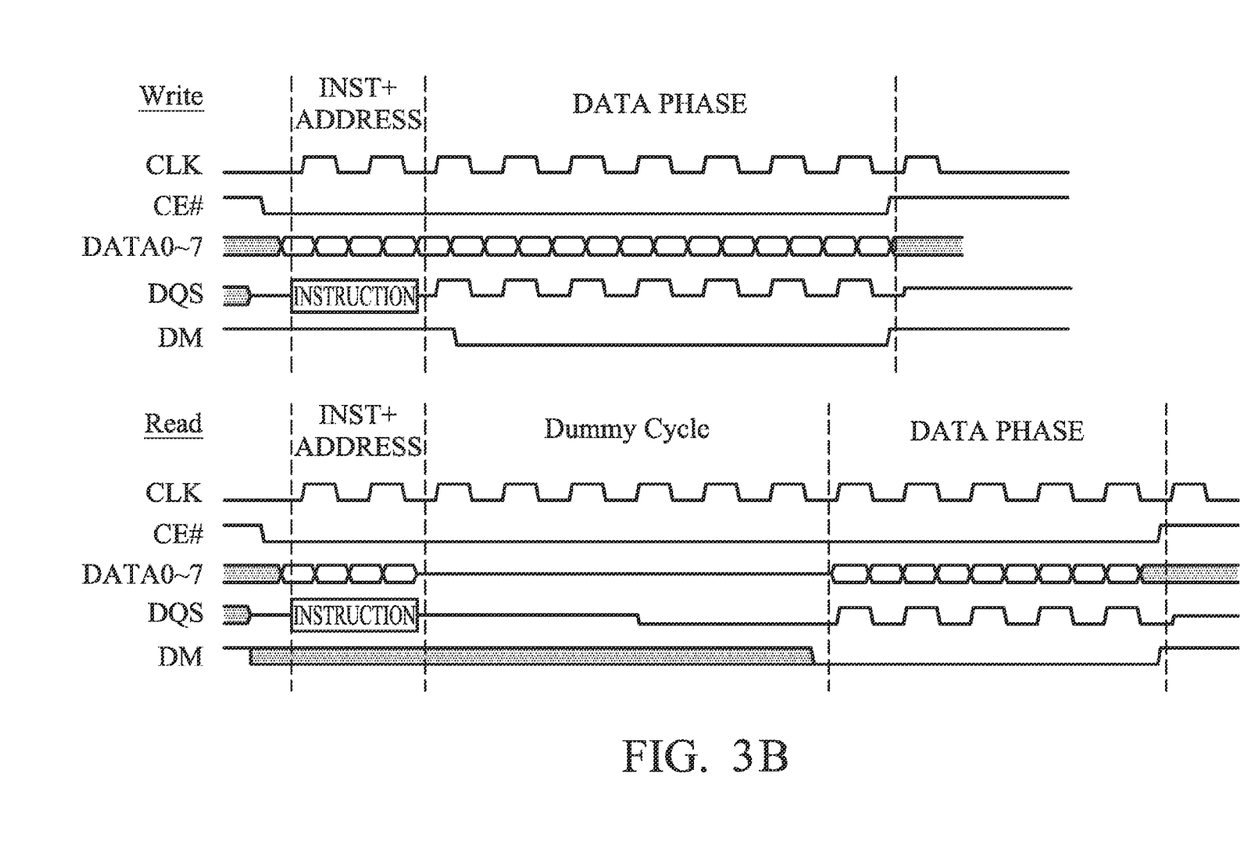

Referring to the exemplary embodiment of FIG. 3B, the number of data I/Os is expended to eight (DATA0~7) in comparison with the exemplary embodiment of FIG. 3A and, accordingly, a data mask port DM is provided in the media peripheral interface 106. In the eight bits data interface, the instruction and the read/write address are separately transferred by the data strobe port DQS and the data I/Os DATA0~7 and are simultaneously captured according to the rising edges and the falling edges of the clock signal CLK.

Figure 3C:
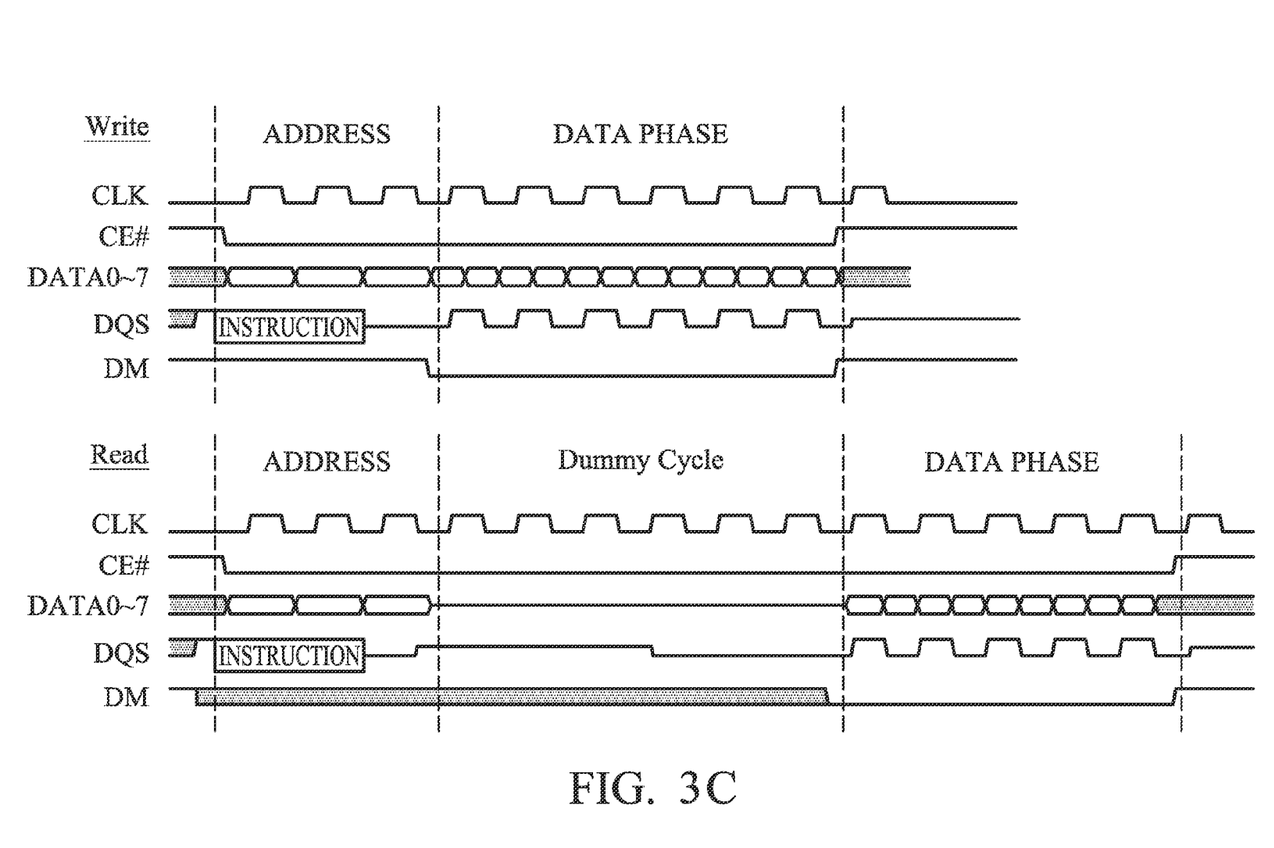

Note that in some embodiments the instruction transferred by the data strobe port DQS and the read/write address transferred by the data I/Os are captured by only particular transition edges (e.g. only H→L transition edges, or, only L→H transition edges) of the clock signal CLK rather than by all transition edges of the clock signal CLK. As shown in FIG. 3C, the instruction transferred by the data strobe port DQS and the read/write address transferred by the data I/Os DATA0~7 are captured according to only the rising edges of the clock signal CLK.

Figure 4:
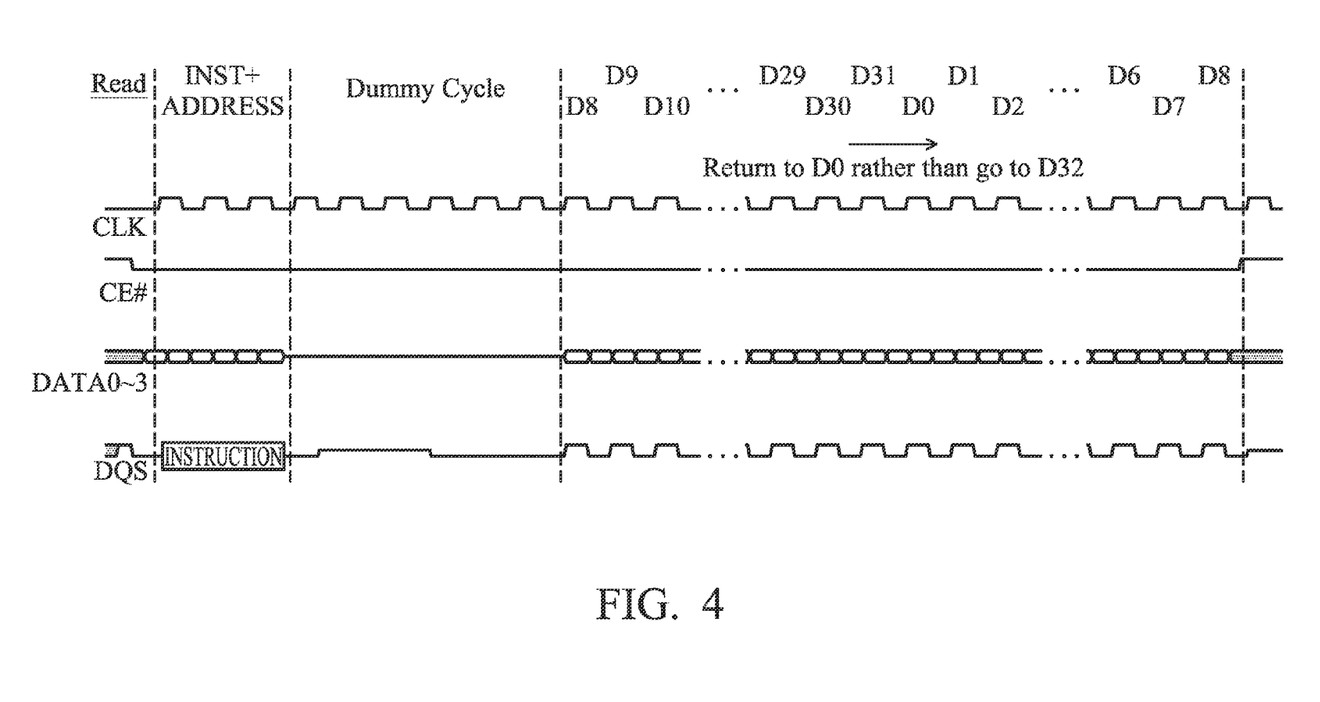

In some exemplary embodiments, the peripheral device 104 may operate in a wrap mode to be read/written in a wrap-around fashion. For example, when the peripheral device 104 is a FLASH memory, a block-wise read/write service may be requested. The pages of the requested block may be transferred in a wrap-around fashion, thus, completing the read/write operation on the requested block. When the peripheral device 104 operates in a wrap mode, the data transferred via the data I/Os DATA of the media peripheral interface 106 is transferred in a wrap-around fashion. FIG. 4 shows how the data is transferred in the wrap-around fashion, wherein 32 data is requested. According to the read address captured in a command information phase (phase 'INST-FADDRESS'), data D8 is read out from the peripheral device 104 first and then data D9 to data D31 are read out sequentially and then data D0-D8 are returned subsequently.

In some exemplary embodiments, the media peripheral interface 106 may be switched to work as a conventional serial peripheral interface (SPI) when the data rate of the peripheral device 104 is quite low. When being switched to be a conventional SPI, the data strobe port DQS and the data mask signal port DM may be left unused.

Figure 5:
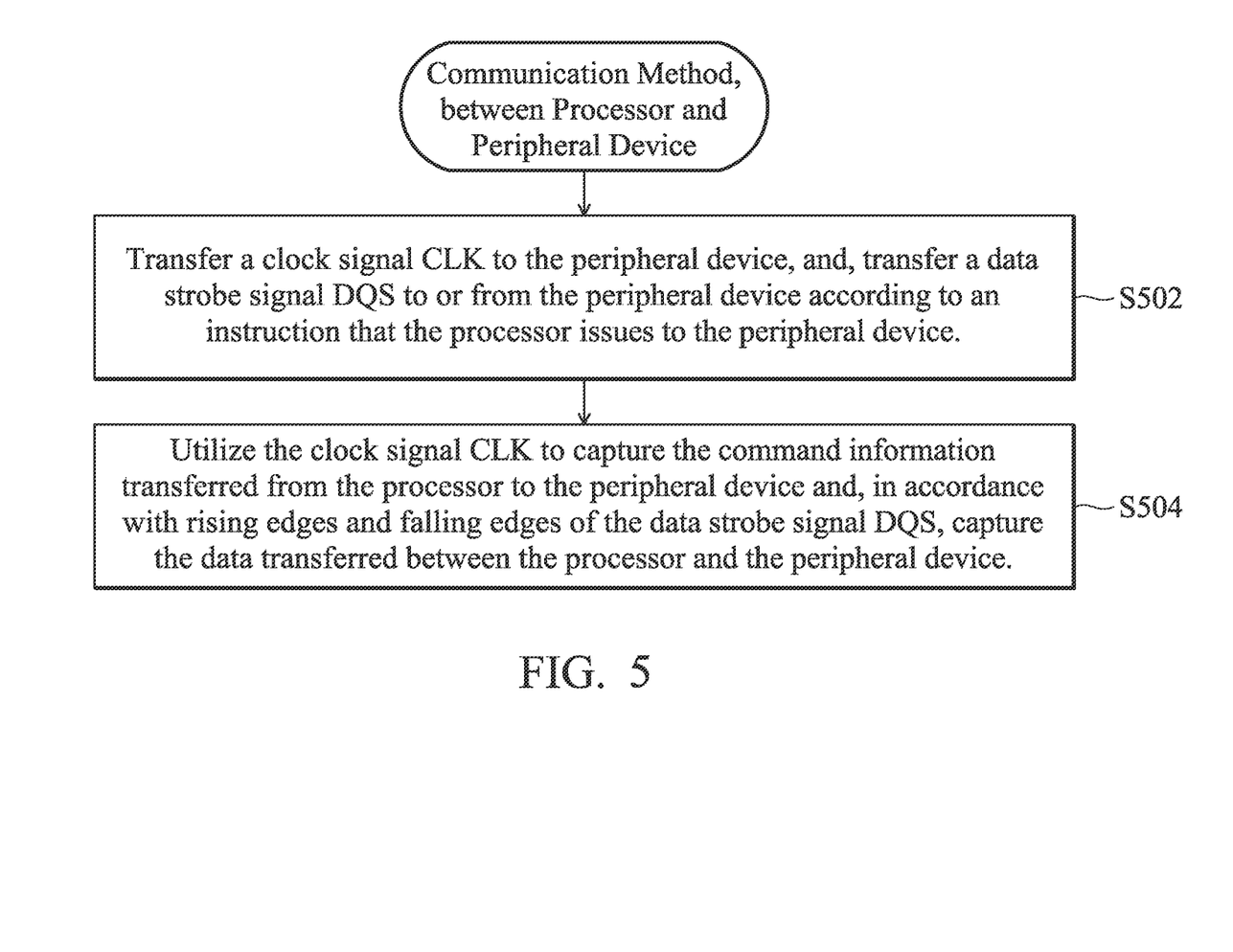
FIG. 5 is a flowchart depicting the communication method between a processor and a peripheral device.

Further, a communication method between a processor and a peripheral device is disclosed. FIG. 5 is a flowchart depicting the communication method. In step S502, a clock signal CLK is transferred to the peripheral device, and, a data strobe signal DQS is transferred to or from the peripheral device according to an instruction that the processor issues to the peripheral device. In step S504, the clock signal CLK is utilized to capture the command information transferred from the processor to the peripheral device and, in accordance with rising edges and falling edges of the data strobe signal DQS, the data transferred between the processor and the peripheral device is captured.

In some exemplary embodiments, a blank area of DQS is utilized to transfer the instruction that the processor issues to the peripheral device, such that the read/write address corresponding to the instruction is transferred by a path which is different from that of the instruction. The instruction transferred in the blank area of the data strobe signal DQS and the read/write address that the processor transfers to the peripheral device may be captured simultaneously according to rising edges and falling edges (or, only the particular transition edges) of the clock signal CLK.

In some exemplary embodiments, a data mask signal is further transferred to the peripheral device to mask particular transition edges of the data strobe signal accordingly.

Further, when the peripheral device operates in a wrap mode, the data is transferred in a wrap-around fashion.

In some exemplary embodiments, the disclosed communication method may be implemented by firmware executed by a controller.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A media peripheral interface coupled between a processor and a peripheral device, comprising:
    a clock port, transferring a clock signal to the peripheral device;
    data I/Os, for transferring a read/write address that the processor issues to the peripheral device and for transferring data to and from the peripheral device; and
    a data strobe port, for transferring an instruction that the processor issues to the peripheral device and transferring a data strobe signal to or from the peripheral device according to the instruction,
    wherein:
    the instruction is transferred via the data strobe port and captured according to the clock signal when the read/write address is transferred via the data I/Os; and
    the data transferred via the data I/Os are captured according to rising edges and falling edges of the data strobe signal.

2. The media peripheral interface as claimed in claim 1, wherein the instruction transferred via the data strobe port and the read/write address transferred via the data I/Os are captured according to rising edges and falling edges of the clock signal.

3. The media peripheral interface as claimed in claim 1, wherein the instruction transferred via the data strobe port and the read/write address transferred via the data I/Os are captured according to particular transition edges of the clock signal.

4. The media peripheral interface as claimed in claim 1, further comprising:
    a data mask signal port, for transferring a data mask signal to the peripheral device,
    wherein, in accordance with the data mask signal, particular transition edges of the data strobe signal are masked.

5. The media peripheral interface as claimed in claim 1, wherein:
    when the peripheral device operates in a wrap mode, the data transferred via the data I/Os are transferred in a wrap-around fashion.

6. The media peripheral interface as claimed in claim 1, wherein:
    the clock port is implemented as a differential pair and the clock signal is a differential signal.

7. The media peripheral interface as claimed in claim 1, wherein:
    the data strobe port is implemented as a differential pair and the data strobe signal is a differential signal.

8. The media peripheral interface as claimed in claim 1, which is a PSRAM interface, a FLASH interface, a display interface, or a camera interface.

9. An electronic device comprising:
    the media peripheral interface as claimed in claim 1; and
    the processor and the peripheral device coupled to each other via the media peripheral interface.

10. The electronic device as claimed in claim 9, wherein the processor, the media peripheral interface and the peripheral device are enclosed in a single module as a system-in-package.

11. A communication method between a processor and a peripheral device, comprising:
    transferring a clock signal to the peripheral device;
    capturing an instruction and a read/write address transferred from the processor to the peripheral device according to the clock signal, wherein transferring the read/write address via data I/Os and using a blank area of a data strobe signal to transfer the instruction that the processor issues to the peripheral device, thereby the read/write address corresponding to the instruction is transferred by a path which is different from that of the instruction;
    transferring the data strobe signal to or from the peripheral device according to the instruction; and
    capturing data transferred between the processor and the peripheral device via the data I/Os according to rising edges and falling edges of the data strobe signal.

12. The communication method as claimed in claim 11, wherein the instruction and the read/write address are captured simultaneously according to rising edges and falling edges of the clock signal.

13. The communication method as claimed in claim 11, wherein the instruction and the read/write address are captured simultaneously according to particular transition edges of the clock signal.

14. The communication method as claimed in claim 11, further comprising:
    transferring a data mask signal to the peripheral device to mask particular transition edges of the data strobe signal in accordance with the data mask signal.

15. The communication method as claimed in claim 11, further comprising:
    transferring the data transferred in a wrap-around fashion when the peripheral device operates in a wrap mode.

16. The communication method as claimed in claim 11, wherein:
    the clock signal is a differential signal.

17. The communication method as claimed in claim 11, for communication between the processor and a PSRAM, a FLASH, a display or a camera.

* * * * *